United States Patent
Li et al.

(10) Patent No.: US 9,966,631 B1
(45) Date of Patent: May 8, 2018

(54) GENERATION OF WRINKLE-FREE SILICON MONOXIDE ELECTRODES USING SEPARATE PREFORMATION AND FORMATION

(71) Applicant: Kitty Hawk Corporation, Mountain View, CA (US)

(72) Inventors: Chen Li, Santa Clara, CA (US); Patrick K. Herring, Redwood City, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days. days.

(21) Appl. No.: 15/659,942

(22) Filed: Jul. 26, 2017

(51) Int. Cl.
| | |
|---|---|
| *H01M 4/04* | (2006.01) |
| *H01M 4/1395* | (2010.01) |
| *H01M 4/38* | (2006.01) |
| *H01M 4/62* | (2006.01) |
| *H01M 10/0525* | (2010.01) |
| *H01M 10/0566* | (2010.01) |
| *C01B 33/02* | (2006.01) |
| *C01B 33/113* | (2006.01) |

(52) U.S. Cl.
CPC ......... *H01M 10/0566* (2013.01); *C01B 33/02* (2013.01); *C01B 33/113* (2013.01); *H01M 4/0469* (2013.01); *H01M 4/1395* (2013.01); *H01M 4/386* (2013.01); *H01M 4/625* (2013.01); *H01M 10/0525* (2013.01)

(58) Field of Classification Search
CPC ......... H01M 10/0566; H01M 10/0525; H01M 4/0469; H01M 4/1395; H01M 4/386; H01M 4/625; C01B 33/02; C01B 33/113
USPC ................. 429/218.1, 326; 427/81; 29/623.5
See application file for complete search history.

(56) References Cited

U.S. PATENT DOCUMENTS

| | | | | |
|---|---|---|---|---|
| 2011/0052953 | A1* | 3/2011 | Saito | H01M 4/139 429/94 |
| 2013/0266875 | A1* | 10/2013 | Matsumoto | H01M 4/382 429/338 |
| 2014/0170484 | A1 | 6/2014 | Fukahori | |
| 2014/0197805 | A1* | 7/2014 | Greening | H01M 10/0525 320/162 |
| 2017/0074634 | A1* | 3/2017 | Yoon | G01B 7/06 |

FOREIGN PATENT DOCUMENTS

| | | | |
|---|---|---|---|
| JP | 2011108550 A * | 6/2011 | |
| WO | WO-2016085271 A1 * | 6/2016 | G01B 21/08 |

OTHER PUBLICATIONS

Nishijima et al., Machine translation of JP 2011-108550 A, Jun. 2011 (Year: 2011).*
Author Unknown, "Lithium—silicon battery", from Wikipedia, the free encyclopedia, downloaded from "https://en.wikipedia.org/w/index.php?title=Lithium%E2%80%93silicon_battery&oldid=761705614" on May 2, 2017; last modified Jan. 24, 2017.

* cited by examiner

*Primary Examiner* — Sean P Cullen
(74) *Attorney, Agent, or Firm* — Van Pelt, Yi & James LLP

(57) ABSTRACT

A solid electrolyte interface is formed on a silicon monoxide electrode in a battery cell. After the solid electrolyte interface is formed on the silicon monoxide electrode, the battery cell is charged for one or more initial cycles while the battery cell is compressed.

6 Claims, 12 Drawing Sheets

//GENERATION OF WRINKLE-FREE SILICON MONOXIDE ELECTRODES USING SEPARATE PREFORMATION AND FORMATION

BACKGROUND OF THE INVENTION

New types of battery cells with silicon-based (e.g., silicon monoxide (SiO)) electrodes are being developed because they have the potential for better energy density and/or capacity compared to graphite-based electrodes. As a result of their new composition (i.e., silicon-based instead of graphite-based), new techniques for producing battery cells with silicon-based electrodes must be developed. Naturally, it would be desirable if such new production techniques resulted in high quality battery cells, for example with desirable electrical and/or physical characteristics.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to produce a wrinkle-free silicon monoxide electrode using separate preformation and formation steps are described herein. In some embodiments, this is done by forming a solid electrolyte interface on a silicon monoxide electrode in a battery cell and after the solid electrolyte interface is formed on the silicon monoxide electrode, charging the battery cell for a first time while the battery cell is compressed. The step of forming a solid electrolyte interface on an electrode (e.g., a SiO anode or cathode) is referred to herein as the preformation step. The step of charging the battery cells for the first time is referred to herein as the formation step. As will be described in more detail below, by compressing the battery cell (and everything in it) during the formation step, a wrinkle-free battery cell is produced.

Figure 1:
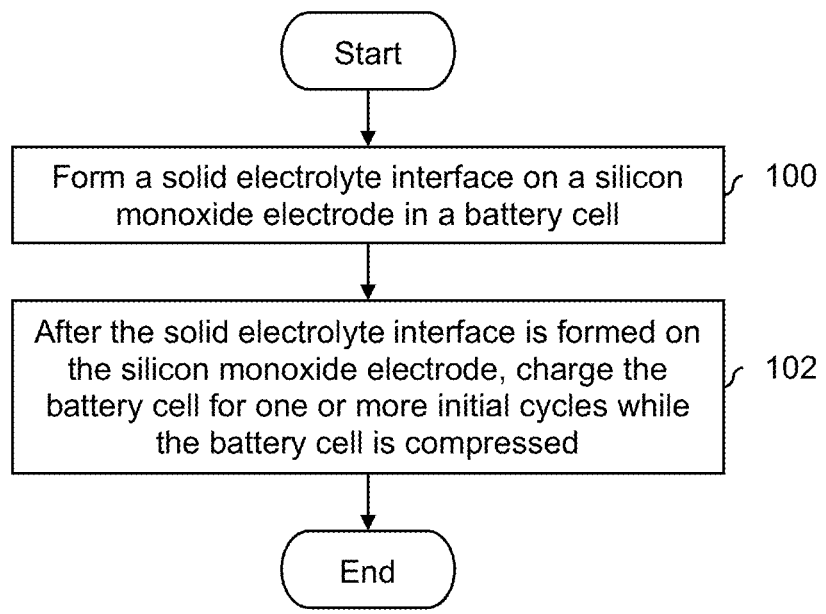
FIG. 1 is a flowchart illustrating an embodiment of a process to produce a wrinkle-free silicon monoxide electrode using separate preformation and formation steps.

FIG. 1 is a flowchart illustrating an embodiment of a process to produce a wrinkle-free silicon monoxide electrode using separate preformation and formation steps. As will be described in more detail below, this process produces a solid electrolyte interface (SEI) with good electrical and/or physical properties or characteristics, such as low resistance, good proximity, etc.

At 100, a solid electrolyte interface (SEI) is formed on a silicon monoxide (SiO) electrode in a battery cell. An example of this is described in more detail below where the battery cell is filled with liquid electrolyte (e.g., a lithium-based liquid electrolyte, such as a combination of ethylene carbonate (EC), ethyl-methyl carbonates (EMC), and/or dimethyl carbonate (DMC), as well as lithium hexafluorophosphate (LiPF6)). The solid electrolyte interface is then gradually formed by applying a charging current to the battery cell (e.g., multiple times). This causes the liquid electrolyte in contact with the electrodes (e.g., a SiO anode and a cathode) to change from a liquid state to a solid state with the thickness of the SEI gradually increasing. As described above, step 100 is referred to as the preformation step.

At 102, after the solid electrolyte interface is formed on the silicon monoxide electrode, the battery cell is charged for one or more initial cycles while the battery cell is compressed. By applying pressure to the battery cell while the SEI is charged for the first n times (e.g., where n≥1), all of the layers within the battery cell (e.g., the separator, the SiO anode, etc.) which result or are otherwise produced will be flat and not wrinkled. As described above, step 102 is referred to as the preformation step.

The following figure shows an example of the layers in a battery cell involved in a preformation step.

Figure 2:
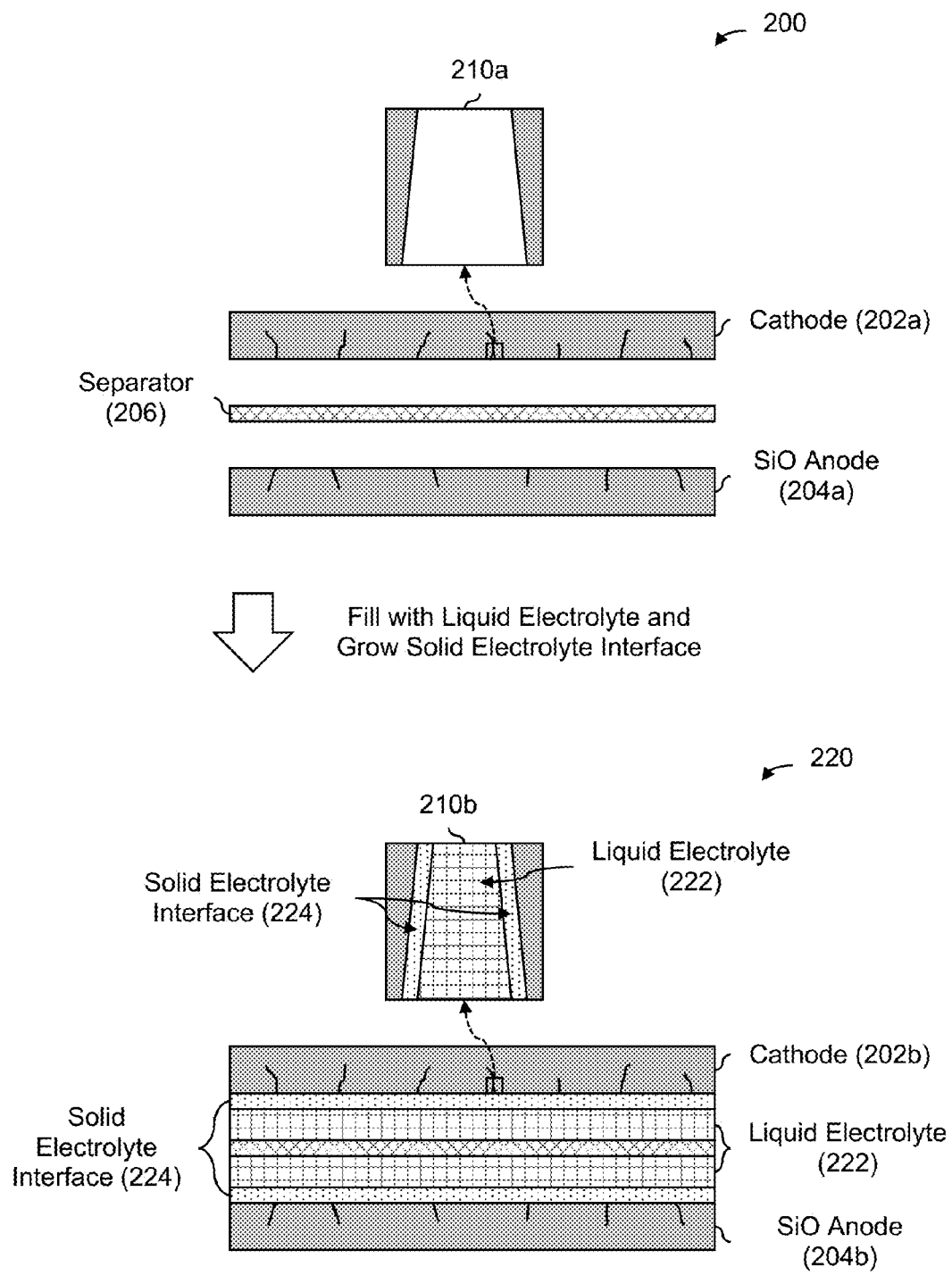
FIG. 2 is a diagram illustrating an embodiment of a cross section of a battery cell before and after a solid electrolyte interface (SEI) is grown during a preformation step.

FIG. 2 is a diagram illustrating an embodiment of a cross section of a battery cell before and after a solid electrolyte interface (SEI) is grown during a preformation step. In the example shown, diagram 200 shows the battery cell before the battery cell has been filled with liquid electrolyte and before the SEI has formed. In the state shown, there is a cathode (202*a*) and a SiO anode (204*a*) with a separator (206) between the two electrodes. In this example, the separator provides a physical barrier which prevents the cathode and anode from touching, which would create a short circuit. As the close up view (210*a*) shows, both the cathode (202*a*) and anode (204*a*) have pores in them.

Diagram 220 shows the battery cell after it has been filled with a liquid electrolyte (222) and the SEI (224) has been formed. The SEI (224) forms from the liquid electrolyte (222) when a charging current is applied to the battery cell (e.g., over multiple cycles). The SEI begins growing where the liquid electrolyte comes into contact with the cathode (202*b*) and the SiO anode (204*b*). As more of the liquid electrolyte changes state from liquid to solid, the SEI continues to grow and the thickness of the SEI increases. As close up view 210*b* shows, the liquid electrolyte (222) permeates the pores of the cathode and anode and the solid electrolyte interface (224) also forms in those pores.

The following figure shows an example of a flat (i.e., good) electrode and a wrinkled (i.e., bad) electrode.

Figure 3:
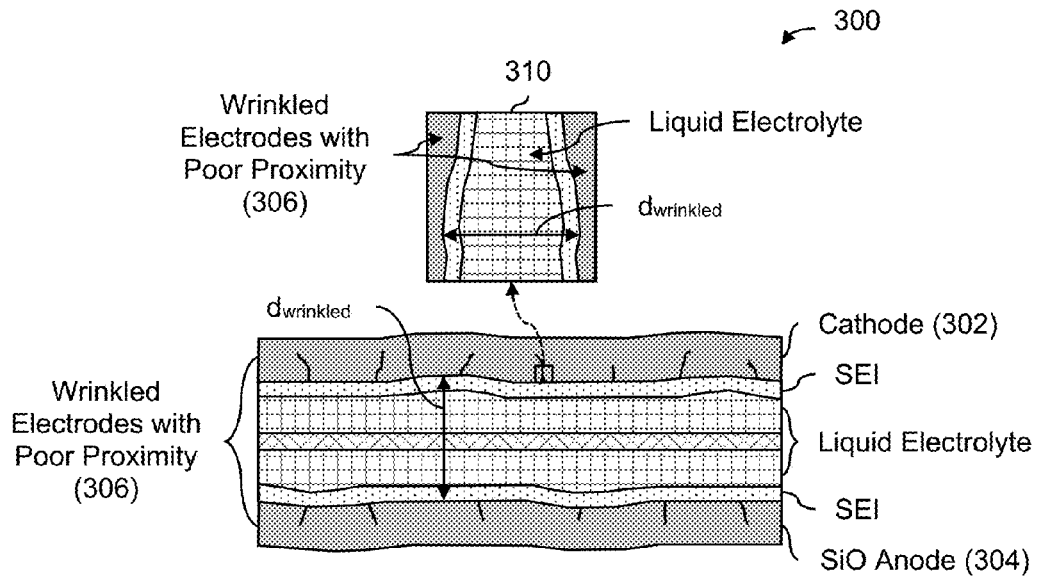
FIG. 3 is a diagram illustrating an embodiment of a cross section of a wrinkled electrode and a flat electrode.
Figure 3:
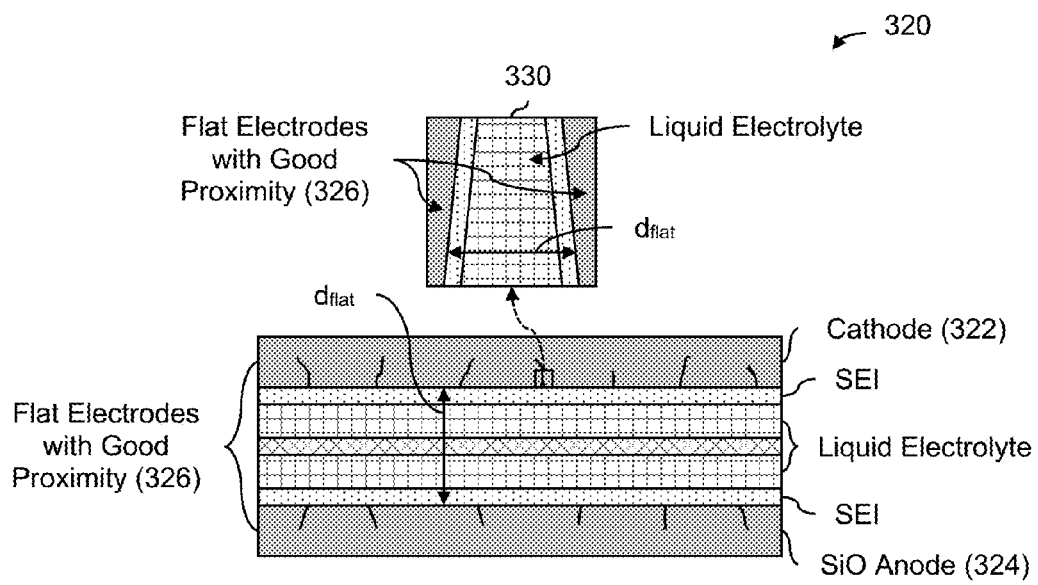

FIG. 3 is a diagram illustrating an embodiment of a cross section of a wrinkled electrode and a flat electrode. In the example shown, diagram 300 shows a battery cell with wrinkled electrodes (306) (i.e., a wrinkled cathode (302) and a wrinkled SiO anode (304)). As shown here, the wrinkled electrodes tend to increase the distance between the two electrodes (in this example, represented by $d_{wrinkled}$), in particular where the wrinkling creates a void or concave region where one electrode (e.g., the SiO anode) pulls away from the other electrode (e.g., the cathode). This is also seen in close up view 310. This wrinkling has been particularly observed with SiO anodes. Electrically, this is undesirable because the charge produced by the battery cell flows from one electrode to the other (e.g., through the increased distance $d_{wrinkled}$) and so the battery cell cannot produce as high of a current when the anode and cathode have poor proximity because it is more difficult for the charge to cross the increased distance. This increased separation is sometimes referred to herein as poor proximity.

Diagram 320 shows an example of a battery cell with flat electrodes (326) (i.e., a flat cathode (322) and a flat SiO anode (324)). As shown here, there are no voids or concave regions in the electrode (326). This is also shown in close up view 330. The flat electrodes mean that the electrodes (i.e., the cathode (322) and SiO anode (324)) have good proximity with each other. That is, the distance between the flat electrodes (i.e., $d_{flat}$) is less than the distance between the wrinkled electrodes (i.e., $d_{wrinkled}$, where $d_{wrinkled} > d_{flat}$). This, in turn, results in a battery cell with good electrical performance. Generally speaking, a battery cell with flat electrodes (i.e., with good proximity) is able to output a higher current than a battery cell with wrinkled electrodes (i.e., with poor proximity). For this reason, techniques which help to produce a flat electrode with good proximity are desirable.

Returning briefly to FIG. 1, the process shown there helps to produce a flat electrode (anode in this case) as opposed to a wrinkled electrode. The materials in the battery cell expand and contract but do so at different rates (e.g., some materials have large volumetric changes while others do not expand and contract as much), which results in a wrinkled electrode as different materials repeatedly expand and contract at different rates. By applying pressure to the battery cell when the battery cell is charged for the first few times (e.g., at step 102), a flatter electrode is produced.

The following figure shows an example of a system which may be used to produce a battery cell per techniques described herein.

Figure 4:
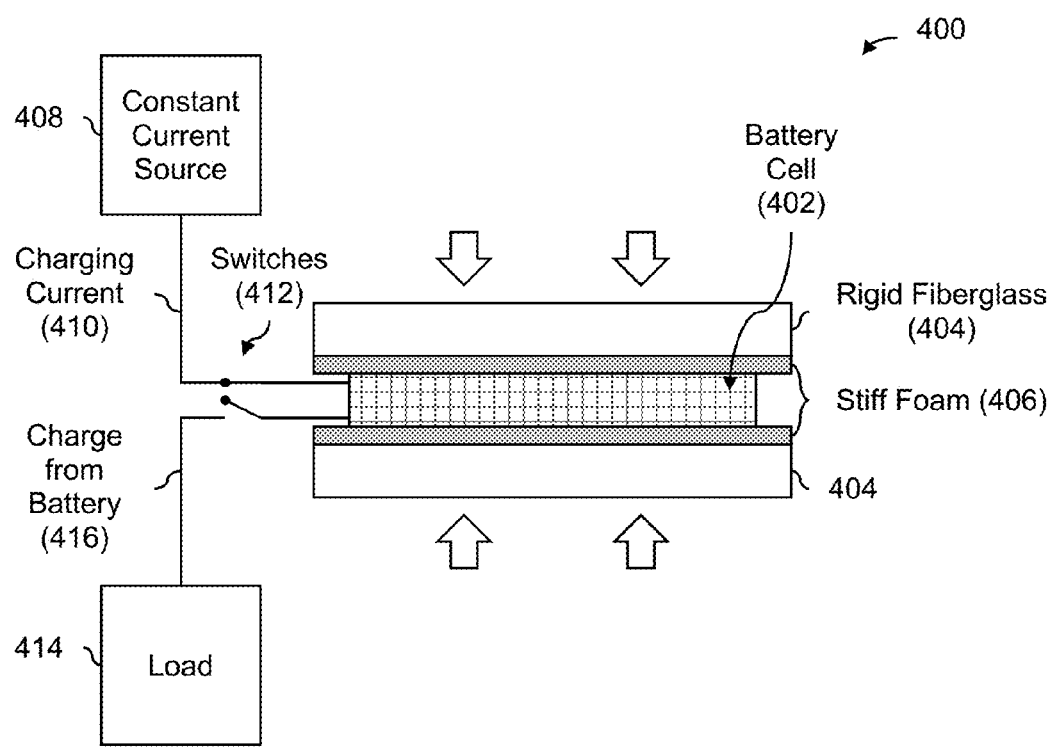
FIG. 4 is a diagram illustrating an embodiment of equipment used to produce a battery cell with a flat electrode.
Figure 4:
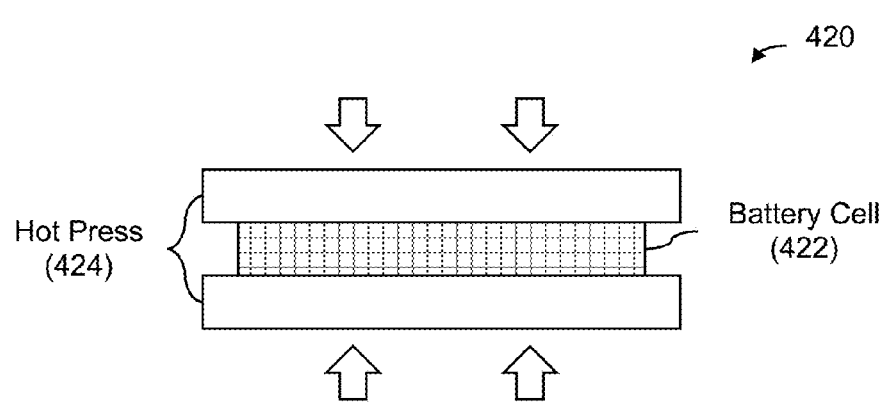

FIG. 4 is a diagram illustrating an embodiment of equipment used to produce a battery cell with a flat electrode. A battery cell being produced or manufactured may be swapped out between the two pieces of equipment shown here depending upon what a given production step calls for.

Diagram 400 shows an example of a system which applies pressure and/or charge to a battery cell. In this example, a battery cell (402) is inside of a clamp which includes rigid fiberglass (404) and stiff foam (406). The stiff foam may be useful because it transfers most of the pressure from the press to the battery cell, but has some "give" to prevent damage to the battery cell. In FIG. 1, the press may be used to apply compress the battery cell at step 102.

The system shown in diagram 400 also includes a constant current source (408) which generates a constant current (410) which is used to charge the battery cell (402). This application of a constant current may be used to form an SEI (e.g., during a preformation step) and/or to charge the battery cell for the first time (e.g., during a formation step). For example, in FIG. 1, the constant current source may be used to charge the battery cell at step 102.

To discharge the battery cell (e.g., if/when called for by some battery cell production process), the switches (412) are configured so that the connection between the constant current source (408) and battery cell (402) is disconnected and the connection between the load (414) and battery cell (402) is connected. This permits the battery cell to discharge by sending charge from the battery (416) to the load (414). For example, some production processes include multiple cycles of charging and discharging, so the switches (412) would be flipped back and forth to alternate between the constant current source (408) during charging and the load (414) during discharging.

It is noted that the application of pressure and charging/discharging may be performed independently of one another and/or in any desired combination. For example, some production processes may include a cycle where a charging current is applied while the battery cell is uncompressed. If so, the press may be opened (not shown here) so that no pressure is applied to the battery cell. Then, while the battery cell is uncompressed, a charging current is applied to the battery cell using the constant current source (408).

Diagram 420 shows an example of a hot press (424) which applies heat and/or pressure to a battery cell (422) which is inside of the hot press. Some production steps may include applying heat and/or pressure to the battery cell and the hot press may be used for those steps. In this example, the hot press is able to reach temperatures in excess of ~100° C. and pressures of ~200 psi. The heat and pressure applied are independent of each other and can be separately controlled so that any desired combination of heat and pressure (within the supported ranges) is possible.

The following figure gives an example of a battery cell production process with separate preformation and formation steps in order to give context to the process of FIG. 1.

Figure 5:
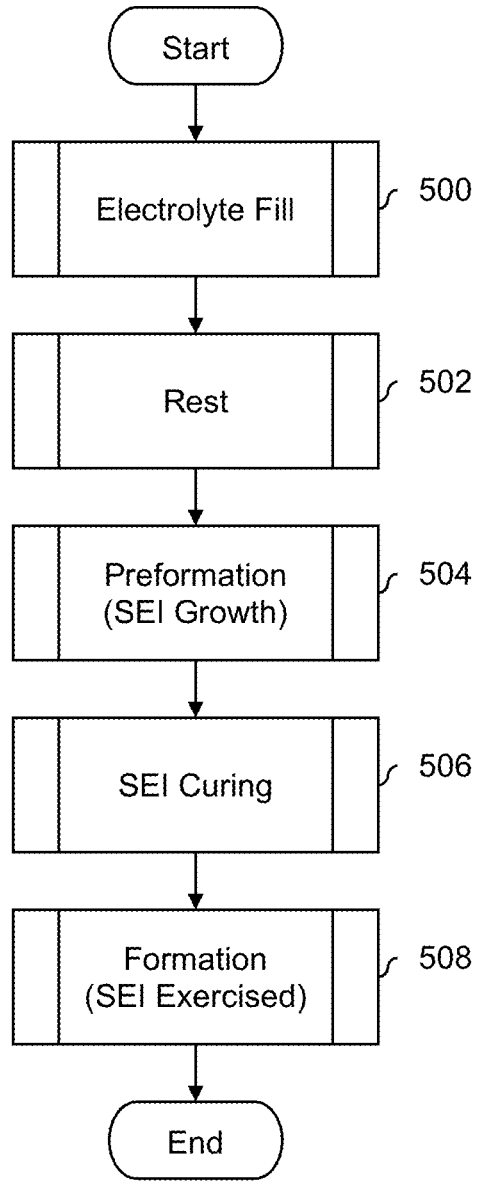
FIG. 5 is a flowchart illustrating an embodiment of battery cell production process with separate preformation and formation steps.

FIG. 5 is a flowchart illustrating an embodiment of battery cell production process with separate preformation and formation steps. In this example, the first step (500) is to fill the battery cell with liquid electrolyte. The battery cells at the beginning of this process have been partially assembled up to the point where the liquid electrolyte is about to be introduced into the battery cell. See, for example, FIG. 2. Once filled with liquid electrolyte, the battery cell will look like the battery cell shown in diagram 220 in FIG. 2, except the SEI has not yet been formed. In the context of FIG. 1, the electrolyte fill step is associated with step 100 since the liquid electrolyte is used to form the SEI.

In one example of step 500, the battery cell is filled at a rate of ~5 mL/Ah. The battery manufacturer may want each battery cell to have some desired amount of capacity (e.g., in Ah) which in turn dictates how much volume of the liquid electrolyte to fill the battery cell with (e.g., in mL). The filled battery cell then rests for ~2 hours while sealed with a clip and is then vacuum sealed.

The second step is a rest step (502). In one example, the battery cell rests for ~12-24 hours at an elevated temperature of ~45° C. The battery cell is then pressed at relatively high pressure (e.g., 100-200 psi) for a brief period of time (e.g., 10-20 seconds) at room temperature so that the electrode is flat and not wrinkled. No charge is applied to the battery cell during this rest step (502).

The third step is the preformation step (504) during which the SEI is grown. A detailed example of a preformation step is described in more detail below.

The fourth step is to cure the SEI (506). In one example, the battery cell rests in an oven at a temperature of ~45° C. for ~12-24 hours. The battery cell is then pressed at a high pressure (e.g., 100-200 psi) for a brief period of time (e.g., 10 seconds) at an elevated temperature (e.g., 10-20 seconds). For example, hot press 424 in FIG. 4 may be used. The applied heat could cause undesirable chemical reactions in the battery cell if applied for too long of a time so the duration is kept relatively short (e.g., 10-20 seconds).

The last step (508) is the formation step during which the SEI is charged and discharged for one or more initial cycles. A detailed example of a formation step is described below.

The following figure gives a more detailed example of a preformation step (504).

Figure 6:
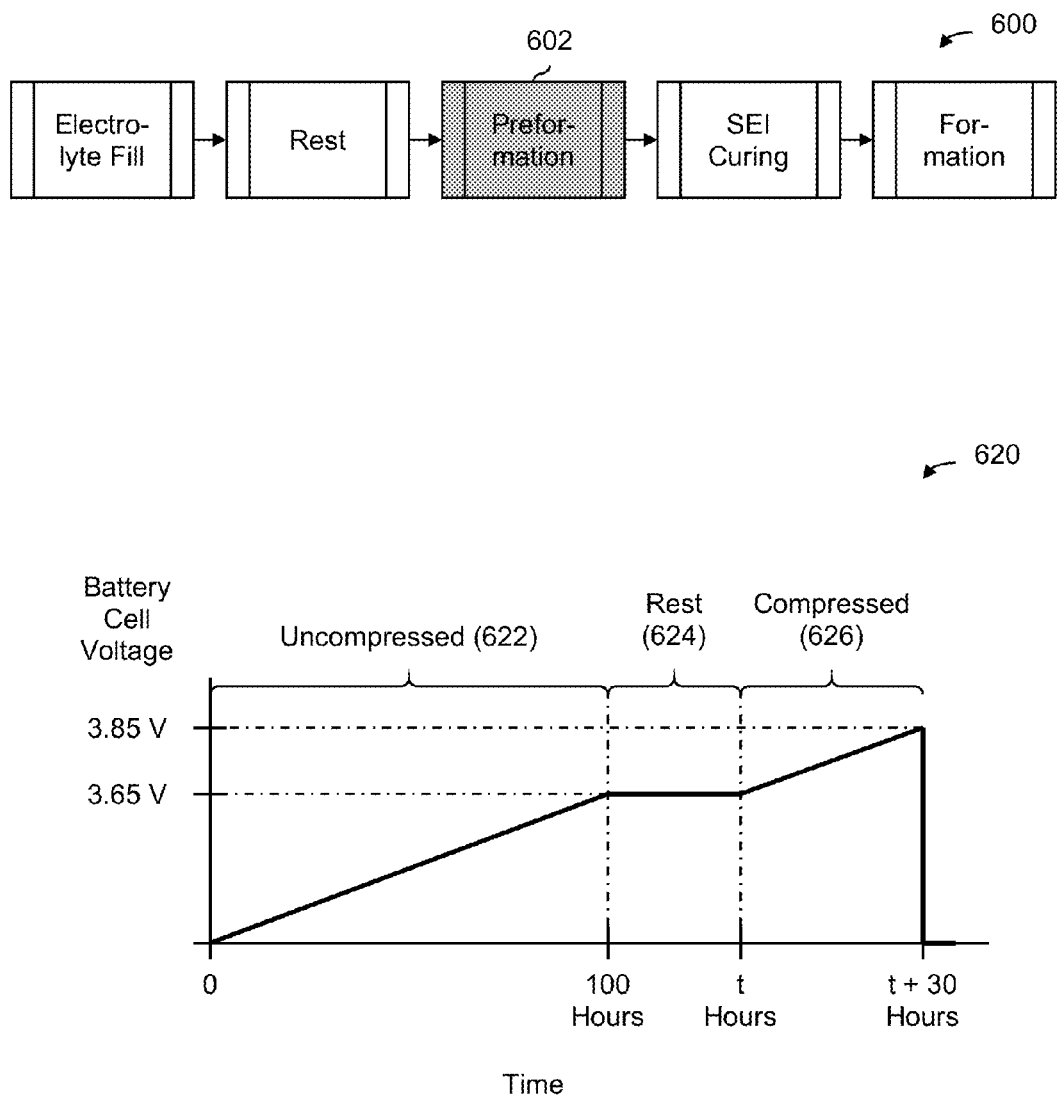
FIG. 6 is a diagram illustrating an embodiment of a preformation step during which a solid electrolyte interface (SEI) is grown.

FIG. 6 is a diagram illustrating an embodiment of a preformation step during which a solid electrolyte interface (SEI) is grown. For context and as a reminder, diagram 600 shows that this example is performed during a preformation step (602). With regard to FIG. 1, this example is associated with step 100.

Diagram 620 shows a graph where the x-axis is time and the y-axis is the voltage of the battery cell. During a first period of time (622) from 0 to 100 hours, the cell is charged from its initial voltage to 3.65V (e.g., which causes the SEI to partially grow), the temperature is substantially at room temperature (e.g., ~25° C.-50° C.), and the battery cell is uncompressed.

During the next period of time (624), the battery cell rested from 100 hours to t during which no charge is applied to the battery cell and no pressure is applied to the battery cell. In one example, the rest period (624) lasts for a duration of 12 hours.

During the third period (626) from t to t+30 hours (i.e., over a span of 30 hours), the battery cell is charged, increasing its resting voltage to 3.85 V (e.g., which further grows the SEI which was partially or initially grown during period 622), the temperature is substantially at room temperature (e.g., ~25° C.-50° C.), and the battery cell is compressed at a pressure of ~20 psi-60 psi.

Each time a current is applied and the battery cell's voltage gradually increases in this example (e.g., during period 622 and 626), the SEI grows a little bit more. For example, during the first charging cycle (622), some molecules of the liquid electrolyte change from a liquid state to a solid state, forming a partial or initial SEI on the SiO anode. This partial or initial SEI is then grown further during the second charging cycle (622). To put it another way, as this example shows, the SEI may be grown over multiple cycles.

In this example, the battery cell is not compressed during the first charging period (622). This may be acceptable because even if the electrode is slightly or initially wrinkled, the pressure applied during the later period of battery cell charging (e.g., 626) is sufficient to flatten the electrode. Naturally, if desired, the battery cell may be compressed during the first period as well.

With regard to the temperature, the battery cell is kept at substantially room temperature (e.g., ~25° C.-50° C.) during the periods shown (622-626). Heating the battery cell to relatively high temperatures (e.g., in excess of 60° C.) for prolonged periods of time (e.g., minutes or longer) could cause unwanted and/or undesirable chemical reactions in the battery cell. For this reason, it is desirable to keep the battery cell substantially at room temperature where possible.

This example is described more generally and/or formally in flowcharts below.

Figure 7:
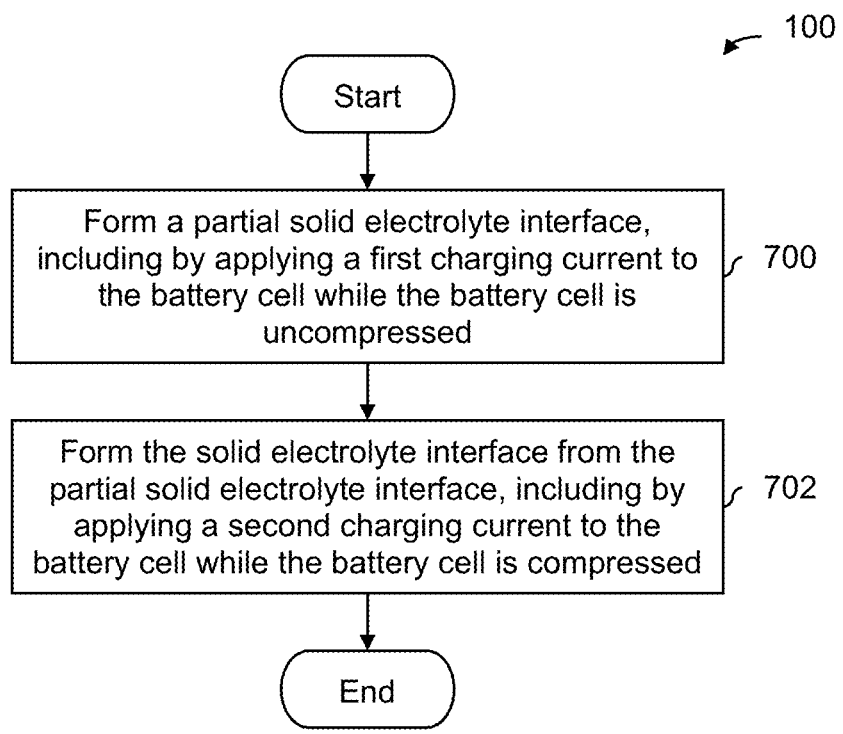
FIG. 7 is a diagram illustrating an embodiment of a process to form a solid electrolyte interface over at least two cycles of battery cell charging.

FIG. 7 is a diagram illustrating an embodiment of a process to form a solid electrolyte interface over at least two cycles of battery cell charging. In some embodiments, the process of FIG. 7 is used to perform step 100 in FIG. 1.

At 700, a partial solid electrolyte interface is formed, including by applying a first charging current to the battery cell while the battery cell is uncompressed. Period 622 in FIG. 6 shows an example of this where a charging current is applied until the battery cell's voltage reaches 3.65 V. As shown in FIG. 4, in some embodiments, a constant current is applied.

At 702, the solid electrolyte interface is formed from the partial solid electrolyte interface, including by applying a second charging current to the battery cell while the battery cell is compressed. Period 626 in FIG. 6 shows one example of this where a charging current is applied until the battery cell's voltage reaches 3.85 V.

Figure 8:
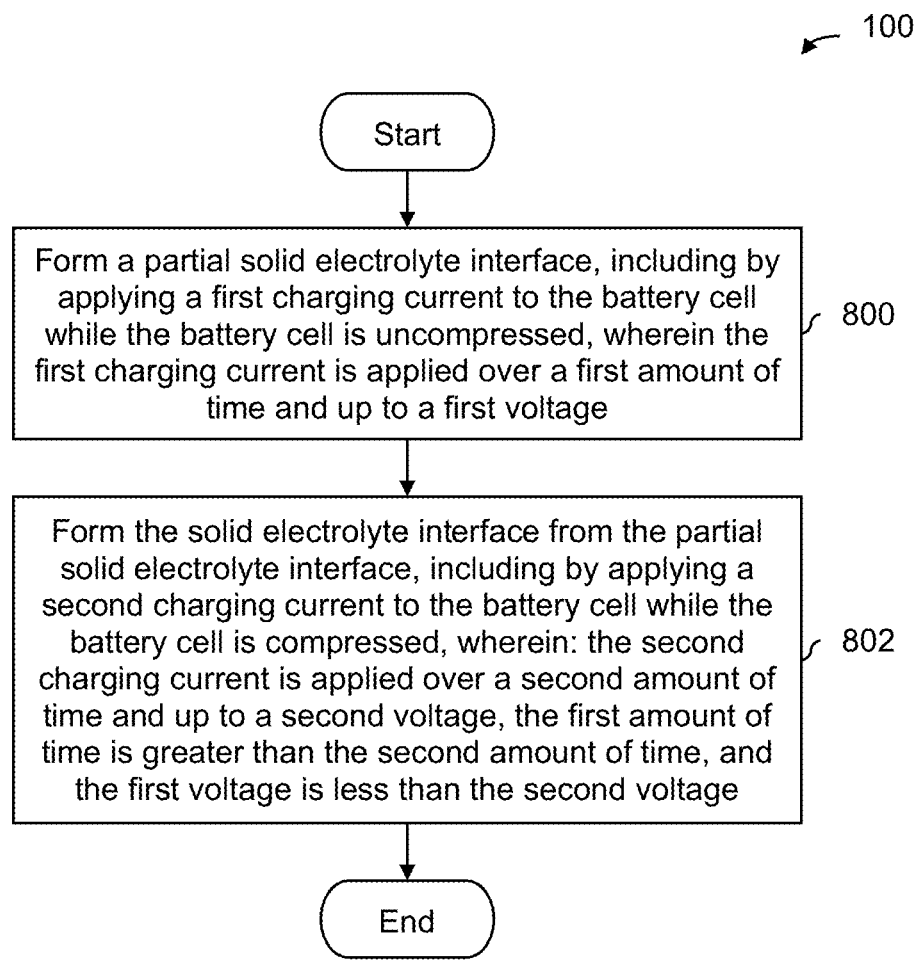
FIG. 8 is a diagram illustrating an embodiment of a process to form a solid electrolyte interface over at least two cycles of battery cell charging over different amounts of time and up to different voltages.

FIG. 8 is a diagram illustrating an embodiment of a process to form a solid electrolyte interface over at least two cycles of battery cell charging over different amounts of time and up to different voltages. In some embodiments, the process of FIG. 8 is used to perform step 100 in FIG. 1.

At 800, a partial solid electrolyte interface is formed, including by applying a first charging current to the battery cell while the battery cell is uncompressed, wherein the first charging current is applied over a first amount of time and up to a first voltage. See, for example, the first battery charge which occurs during period 622 in FIG. 6. In that example, the first amount of time=100 hours and the first voltage=3.65 V.

At 802, the solid electrolyte interface is formed from the partial solid electrolyte interface, including by applying a second charging current to the battery cell while the battery cell is compressed, wherein: the second charging current is increased over a second amount of time and up to a second voltage, the first amount of time is greater than the second amount of time, and the first voltage is less than the second voltage. See, for example, the second battery charge which occurs during period 626 in FIG. 6 where the second amount of time=30 hours and the second voltage=3.85 V. As specified by step 806, the first amount of time (i.e., 100 hours) is greater than the second amount of time (i.e., 30 hours) and the first voltage (i.e., 3.65 V) is less than the second voltage (i.e., 3.85 V).

The following figure describes an example of a formation step.

Figure 9:
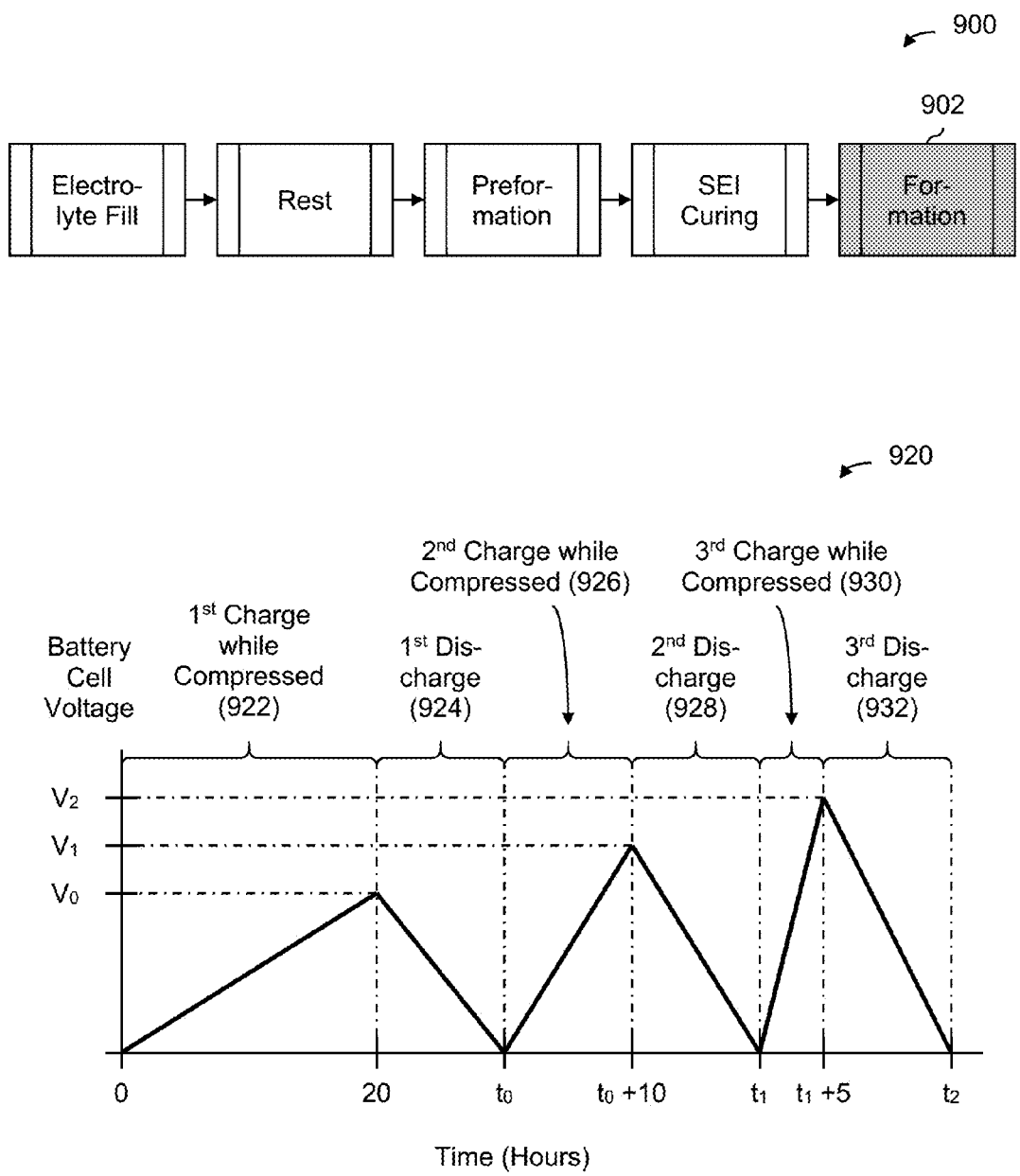
FIG. 9 is a diagram illustrating an embodiment of a formation step during which an electrode is charged for the first time.

FIG. 9 is a diagram illustrating an embodiment of a formation step during which an electrode is charged for the first time. For context and as a reminder, diagram 900 shows that this example is performed during a formation step (902).

Diagram 920 shows a graph where the x-axis is time and the y-axis is the voltage of the battery cell. During a first charging period (922), a charging current is applied to the battery cell until the voltage has increased to a first voltage ($V_0$) from time 0 to 20 hours which charges the battery cell for a first time. In this example, $V_0$ is in the range of ~2.0V to 4.4V. The battery is then discharged during a first discharge period (924) during which time no voltage is applied. For example, in diagram 400 in FIG. 4, the switches (412) would be configured so that the battery cell (402) is able to pass charge to the load (414).

During a second charging period (926), a charging current is again applied until the battery cell's voltage has increased to a second voltage ($V_1$) over a period of 10 hours. In this example, $V_1$ is in the range of ~2.5V to 4.4V. The battery cell is then discharged during a second discharge period (928).

During a third charging period (930), a charging current is applied to increase the battery cell's voltage to a third voltage ($V_2$) over a period of 5 hours. In this example, $V_2$ is in the range of ~2.8V to 4.4V.

In this example, the temperature is kept substantially at room temperature (e.g., in the range of ~25° C.-50° C.) during all of the periods shown here (922-932). As described above, if the battery cell is too hot (e.g., in excess of 60° C.) for too long of a time (e.g., minutes or longer), undesirable chemical reactions may occur in the battery cell and for this reason it may be desirable where possible to perform steps at room temperature.

In this example, the battery cell is compressed during all of the periods shown here (922-932), for example in the range of ~20 psi-60 psi. This pressure helps to keep to keep the electrode flat and prevents wrinkling. Even though the SEI has already formed at this point, the first few cycles of charging after the SEI has formed are important because the electrode could still wrinkle (e.g., because the SEI has not yet hardened and/or set). Since the materials in the battery cell are continually expanding and contracting (with some materials expanding and contracting a great deal, and some other materials not expanding and contracting as much) an unstable SEI could still cause the electrode to wrinkle. By applying pressure during these first few cycles of charging (e.g., where the SEI is being electrically exercised for the first few times), the SEI will "harden" into a good shape where the electrodes have good proximity to each other.

This example is described more generally and/or formally in a flowchart below.

Figure 10:
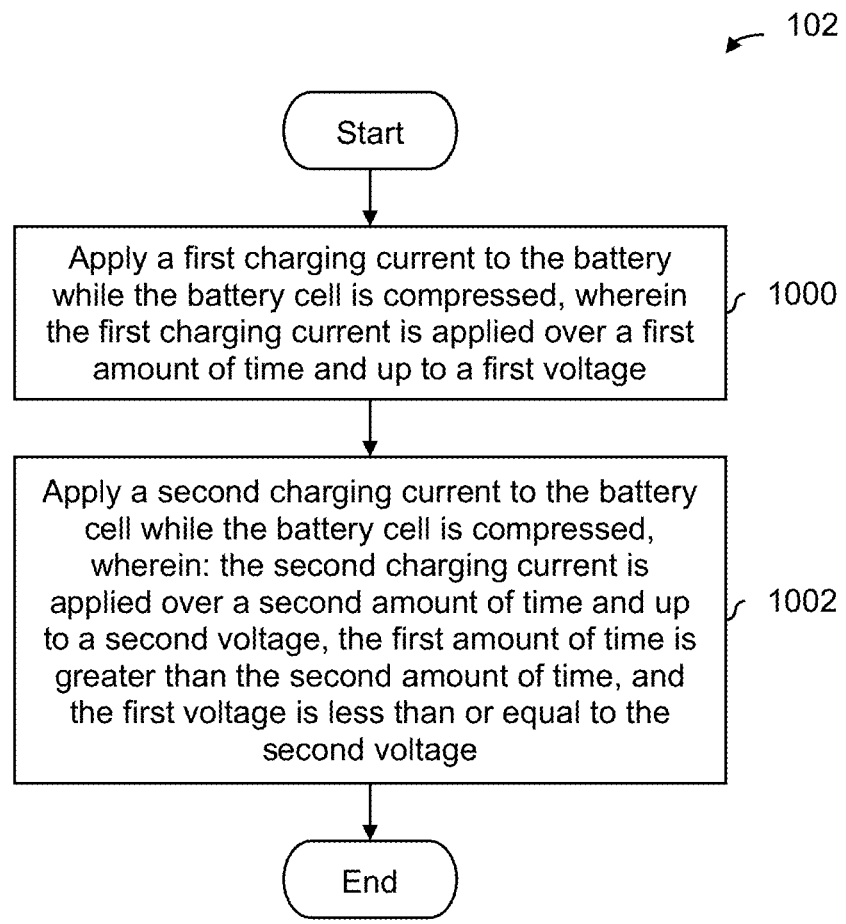
FIG. 10 is a flowchart illustrating an embodiment of a process to charge an electrolyte for one or more initial cycles while a battery cell is compressed.

FIG. 10 is a flowchart illustrating an embodiment of a process to charge an electrolyte for one or more initial cycles while a battery cell is compressed. In some embodiments, the process of FIG. 10 is performed during step 102 of FIG. 1.

At 1000, a first charging current is applied to the battery while the battery cell is compressed, wherein the first charging current is applied over a first amount of time and up to a first voltage. See, for example, the first charging period (922) in FIG. 9.

At 1002, a second charging current is applied to the battery cell while the battery cell is compressed, wherein: the second charging current is applied over a second amount of time and up to a second voltage, the first amount of time is greater than the second amount of time, and the first voltage is less than or equal to the second voltage. See, for example, the second charging period (926) in FIG. 9. As specified by step 1002, the first amount of time (i.e., 20 hours) is greater than the second amount of time (i.e., 10 hours) and the first (ceiling) voltage (in that example, between 2.0V and 4.4V) is less than or equal to the second (ceiling) voltage (in that example, between 2.5V and 4.4V).

In some embodiments, a battery cell is briefly compressed at a relatively high pressure at various times to produce a flat electrode. The following figure shows an example of this.

Figure 11:
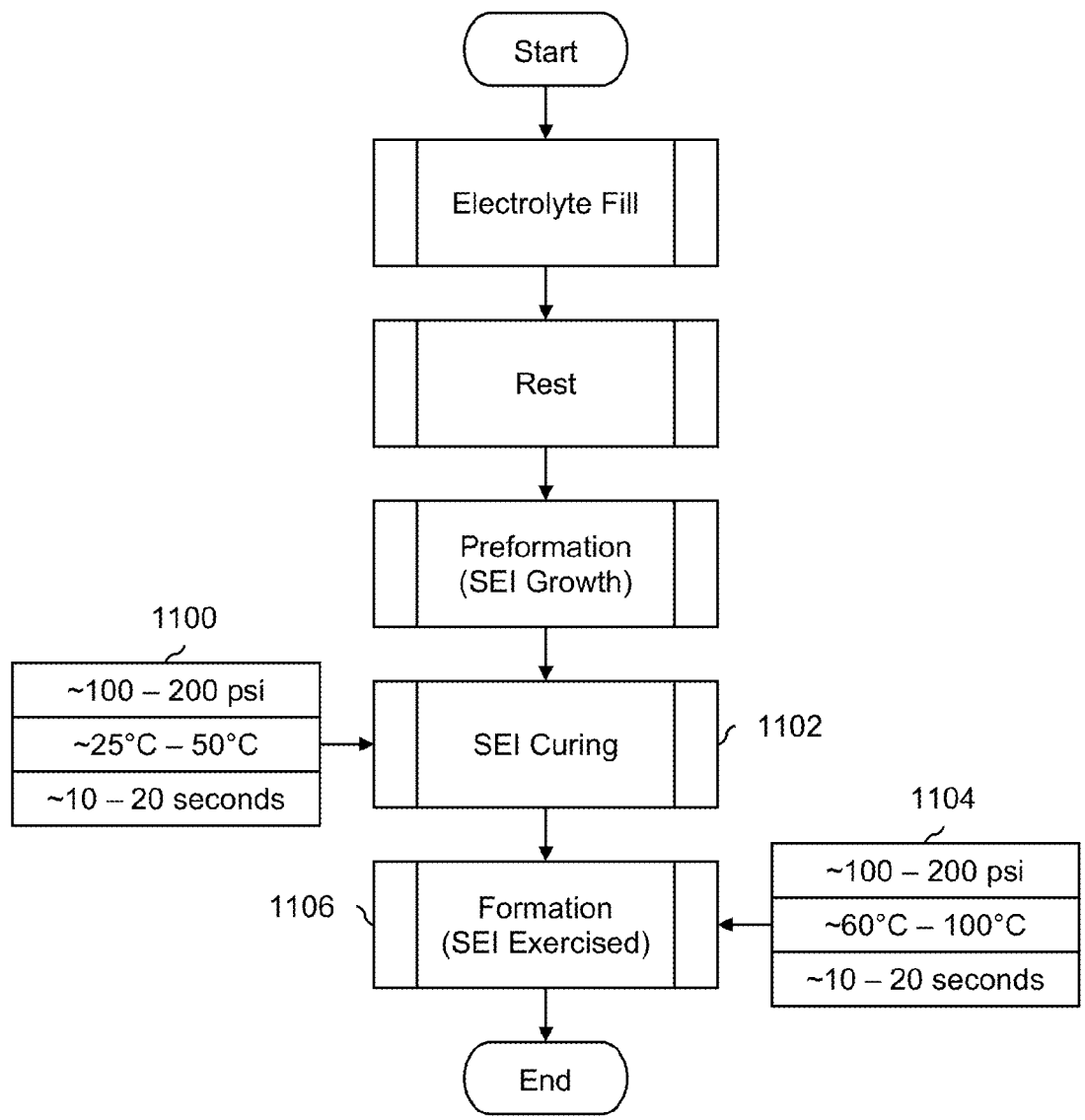
FIG. 11 is a diagram illustrating an embodiment of a high pressure step.

FIG. 11 is a diagram illustrating an embodiment of a high pressure step. In the example shown, a first high pressure step (1100) occurs during an SEI curing step (1102). During this first high pressure step, the battery cell is compressed at ~100-200 psi, substantially at room temperature (e.g., ~25° C.-50° C.), and for a relatively short duration (e.g., ~10-20 seconds).

With regard to other steps in the SEI curing step (1102), the high pressure step (1100) occurs after all other steps have occurred, for example, after letting the battery cell rest for 12-24 hours at elevated temperatures in an oven. To put it another way, high pressure step 1100 occurs right before the formation step (1106).

A second high pressure step (1104) occurs during the formation step (1106). During this second high pressure step, the battery cell is compressed at ~100-200 psi, at an elevated temperature (e.g., ~60° C.-100° C.), and for a relatively short duration (e.g., ~10-20 seconds). In some embodiments, this temperature range (i.e., ~60° C.-100° C.) is used because it is hot enough to soften SEI (which is in solid form) so that the electrode can be pressed flat while still minimizing any undesirable chemical reactions in the battery cell. As described above, this temperature range (e.g., ~60° C.-100° C.) may cause undesirable chemical reactions in the battery cell and therefore this step only lasts for a brief period of time.

With regard to other steps in the formation step (1106), the high pressure step (1104) occurs after all other steps have occurred, for example, after compressing and charging/discharging the battery cell multiple times. For example, with regard to FIG. 9, the second high pressure step (1104) shown here may occur after the charging and discharging shown in FIG. 9.

Briefly compressing the battery cell throughout the production process (one example of which is shown here) may help to produce a flat electrode.

This example is described more generally and/or formally in a flowchart below.

Figure 12:
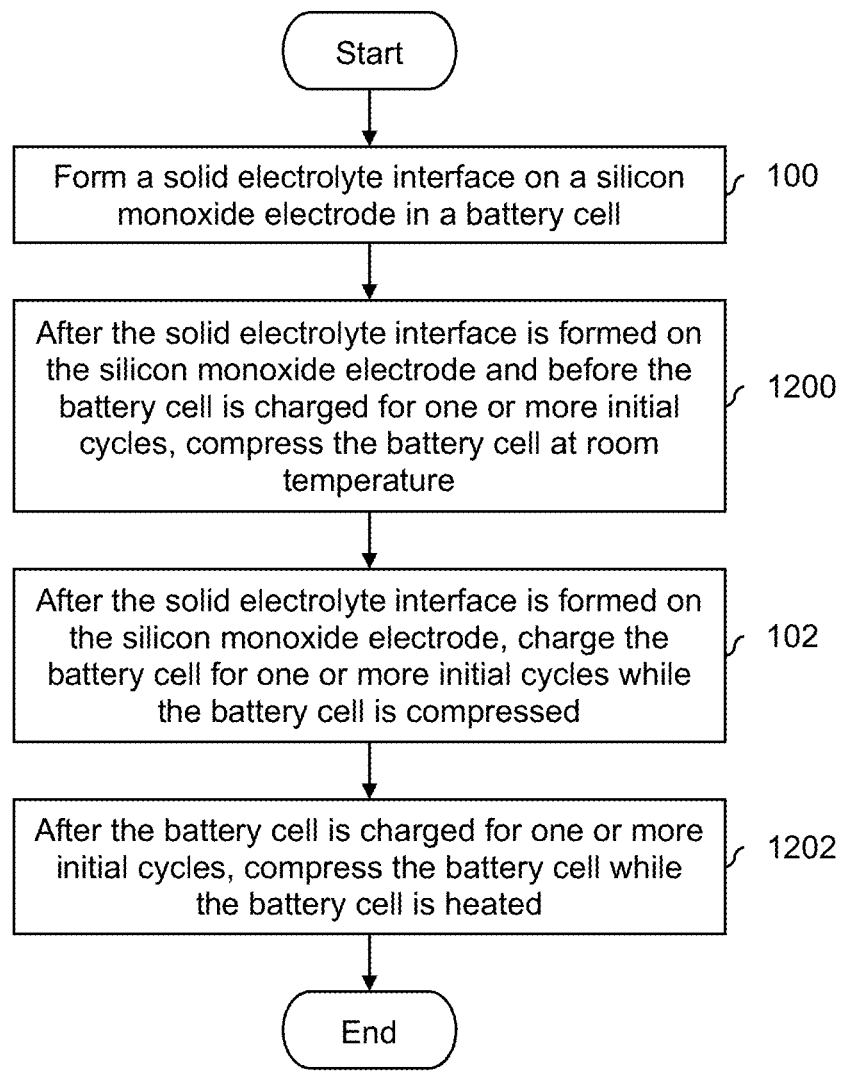
FIG. 12 is a flowchart illustrating an embodiment of a process to produce a wrinkle-free silicon monoxide electrode using separate preformation and formation steps and brief, high compression steps.

FIG. 12 is a flowchart illustrating an embodiment of a process to produce a wrinkle-free silicon monoxide electrode using separate preformation and formation steps and brief, high compression steps. FIG. 12 is related to FIG. 1 and identical reference numbers are used to indicate identical steps.

At 100, a solid electrolyte interface is formed on a silicon monoxide electrode in a battery cell. See, for example, the preformation example shown in FIG. 6.

At 1200, after the solid electrolyte interface is formed on the silicon monoxide electrode and before the battery cell is charged for one or more initial cycles, the battery cell is compressed at room temperature. See, for example, high compression step 1100 in FIG. 11.

At 102, after the solid electrolyte interface is formed on the silicon monoxide electrode, the battery cell is charged for one or more initial cycles while the battery cell is compressed. See, for example, the formation example shown in FIG. 9.

At 1202, after the battery cell is charged for one or more initial cycles, the battery cell is compressed while the battery cell is heated. See, for example, high compression step 1104 in FIG. 11.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    forming a solid electrolyte interface on a silicon monoxide electrode in a battery cell; and
    after the solid electrolyte interface is formed on the silicon monoxide electrode, charging the battery cell for one or more cycles while the battery cell is compressed, including by:
        applying a first charging current to the battery cell while the battery cell is compressed, wherein the first charging current is applied over a first amount of time and up to a first voltage;
        in response to the battery cell reaching the first voltage, discharging the battery cell while the battery cell is compressed;
        after the first charging current has been applied and the battery cell has been discharged, applying a second charging current to the battery cell while the battery cell is compressed, wherein: the second charging current is applied over a second amount of time and up to a second voltage, the first amount of time is greater than the second amount of time, and the first voltage is less than or equal to the second voltage; and
        in response to the battery cell reaching the second voltage, discharging the battery cell while the battery cell is compressed.

2. The method recited in claim 1, wherein forming the solid electrolyte interface includes:
    forming a partial solid electrolyte interface, including by applying a third charging current to the battery cell while the battery cell is uncompressed; and
    forming the solid electrolyte interface from the partial solid electrolyte interface, including by applying a fourth charging current to the battery cell while the battery cell is compressed.

3. The method recited in claim 1 further comprising:
    after the solid electrolyte interface is formed on the silicon monoxide electrode and before the first and the second charging currents are applied and the battery cell is discharged in response to the battery cell reaching the first and the second voltage, compressing the battery cell at room temperature; and
    after the first and the second charging currents are applied and the battery cell is discharged in response to the battery cell reaching the first and the second voltage, compress the battery cell while the battery cell is heated.

4. The method recited in claim 1, wherein forming the solid electrolyte interface includes:
    forming a partial solid electrolyte interface, including by applying a third charging current to the battery cell while the battery cell is uncompressed, wherein the third charging current is applied over a third amount of time and up to a third voltage; and
    forming the solid electrolyte interface from the partial solid electrolyte interface, including by applying a fourth charging current to the battery cell while the battery cell is compressed, wherein: the fourth charging current is applied over a fourth amount of time and up to a fourth voltage, the third amount of time is greater than the fourth amount of time, and the third voltage is less than the fourth voltage.

5. The method recited in claim 1, wherein:
    forming the solid electrolyte interface includes:
        forming a partial solid electrolyte interface, including by applying a third charging current to the battery cell while the battery cell is uncompressed; and
        forming the solid electrolyte interface from the partial solid electrolyte interface, including by applying a fourth charging current to the battery cell while the battery cell is compressed; and
    the method further includes:
        after the solid electrolyte interface is formed on the silicon monoxide electrode and before the first and the second charging currents are applied and the battery cell is discharged in response to the battery cell reaching the first and the second voltage, compressing the battery cell at room temperature; and
        after the first and the second charging currents are applied and the battery cell is discharged in response to the battery cell reaching the first and the second voltage, compress the battery cell while the battery cell is heated.

6. A computer program product, the computer program product being embodied in a non-transitory computer readable storage medium and comprising computer instructions for:
    forming a solid electrolyte interface on a silicon monoxide electrode in a battery cell; and
    after the solid electrolyte interface is formed on the silicon monoxide electrode, charging the battery cell for one or more cycles while the battery cell is compressed, including by:
        applying a first charging current to the battery cell while the battery cell is compressed, wherein the first charging current is applied over a first amount of time and up to a first voltage;
        in response to the battery cell reaching the first voltage, discharging the battery cell while the battery cell is compressed;
        after the first charging current has been applied and the battery cell has been discharged, applying a second charging current to the battery cell while the battery cell is compressed, wherein: the second charging current is applied over a second amount of time and up to a second voltage, the first amount of time is greater than the second amount of time, and the first voltage is less than or equal to the second voltage; and in response to the battery cell reaching the second voltage, discharging the battery cell while the battery cell is compressed.

* * * * *